(12) United States Patent
Grzybowski et al.

(10) Patent No.: US 10,358,386 B2
(45) Date of Patent: Jul. 23, 2019

(54) SHEET GLASS PRODUCT FABRICATION WITH GROWTH-LIMITED GLASS BUMP SPACERS

(71) Applicant: Corning Incorporated, Corning, NY (US)

(72) Inventors: Richard Robert Grzybowski, Corning, NY (US); Daniel Ralph Harvey, Beaver Dams, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 459 days.

(21) Appl. No.: 15/096,751

(22) Filed: Apr. 12, 2016

(65) Prior Publication Data

US 2016/0221869 A1  Aug. 4, 2016

Related U.S. Application Data

(62) Division of application No. 13/482,114, filed on May 29, 2012, now Pat. No. 9,346,710.

(51) Int. Cl.
*C03C 23/00* (2006.01)
*C03B 23/02* (2006.01)
(Continued)

(52) U.S. Cl.
CPC .......... *C03C 23/0025* (2013.01); *C03B 23/02* (2013.01); *C03B 23/24* (2013.01);
(Continued)

(58) Field of Classification Search
CPC .... G02B 1/00–1/18; G02B 5/02–5/028; E06B 3/66–3/669
See application file for complete search history.

(56) References Cited

U.S. PATENT DOCUMENTS

| 1,370,974 A | 3/1921 | Kirlin |
| 1,772,200 A | 8/1930 | Avakoff et al. |

(Continued)

FOREIGN PATENT DOCUMENTS

| CN | 1660709 A | 8/2005 |
| EP | 0047725 A1 | 3/1982 |

(Continued)

OTHER PUBLICATIONS

Chino, "Revolutionary Super-Insulating Vacuum Glass!"; http://www.inhabitat.comI2008/03/24/guardian-develops-hyper-insulating-vacuum-glass!, Mar. 24, 2008.
(Continued)

*Primary Examiner* — William R Alexander
*Assistant Examiner* — Jeffrey E Madonna
(74) *Attorney, Agent, or Firm* — Svetlana Z. Short

(57) ABSTRACT

Methods of forming a sheet glass product comprising a plurality of growth-limited glass bump spacers. According to the methods, a glass pane of the sheet glass product is irradiated with laser radiation to locally heat the glass pane at a plurality of spacer localities and induce growth of a plurality of glass bump spacers in the glass pane. The growth of the plurality of glass bump spacers is limited by utilizing a growth-limiting plate comprising a scattering surface portion. The scattering surface portion of the growth-limiting plate mitigates damage to the growth-limiting plate and may also mitigate damage to the glass pane. Vacuum insulated glass products and systems for forming a growth-limited sheet glass product are also provided.

10 Claims, 1 Drawing Sheet

(51) Int. Cl.
  *C03B 23/24* (2006.01)
  *E06B 3/663* (2006.01)
  *C03B 29/02* (2006.01)
  *E06B 3/66* (2006.01)
  *E06B 3/673* (2006.01)
  *E06B 3/677* (2006.01)
  *G02B 5/02* (2006.01)

(52) U.S. Cl.
  CPC .......... *C03B 29/025* (2013.01); *E06B 3/6612* (2013.01); *E06B 3/66304* (2013.01); *E06B 3/66333* (2013.01); *E06B 3/66347* (2013.01); *E06B 3/677* (2013.01); *E06B 3/67326* (2013.01); *G02B 5/0205* (2013.01); *E06B 2003/66338* (2013.01); *Y02A 30/25* (2018.01); *Y02B 80/24* (2013.01)

(56) References Cited

U.S. PATENT DOCUMENTS

| | | | |
|---|---|---|---|
| 4,683,154 | A | 7/1987 | Benson et al. |
| 5,027,574 | A | 7/1991 | Phillip |
| 5,270,084 | A | 12/1993 | Parker |
| 5,379,149 | A | 1/1995 | Snitzer |
| 5,604,635 | A | 2/1997 | Lawandy |
| 5,794,404 | A | 8/1998 | Kim |
| 5,840,239 | A | 11/1998 | Partanen |
| 5,877,103 | A | 3/1999 | Dupont |
| 6,291,036 | B1 | 9/2001 | Wang et al. |
| 6,472,295 | B1 | 10/2002 | Morris et al. |
| 6,541,084 | B2 | 4/2003 | Wang et al. |
| 6,946,171 | B1 | 9/2005 | Aggas |
| 7,505,660 | B2 | 3/2009 | Bickham |
| 8,887,528 | B2 | 11/2014 | Tanii |
| 2003/0209040 | A1 | 11/2003 | Hashimoto et al. |
| 2004/0253395 | A1* | 12/2004 | Amari ................. C03C 27/06 428/34 |
| 2005/0132662 | A1 | 6/2005 | Hornung |
| 2007/0201797 | A1 | 8/2007 | Grzybowski |
| 2008/0236052 | A1 | 10/2008 | Fleming |
| 2008/0245011 | A1 | 10/2008 | Friedl |
| 2010/0050692 | A1 | 3/2010 | Logunov et al. |
| 2010/0107525 | A1* | 5/2010 | Grzybowski ......... E06B 3/6612 52/204.591 |
| 2010/0186449 | A1 | 7/2010 | Aitken et al. |
| 2010/0206006 | A1 | 8/2010 | Grzybowski et al. |
| 2010/0321787 | A1* | 12/2010 | Han ................. G02B 3/0037 359/641 |
| 2011/0039072 | A1 | 2/2011 | Grzybowski et al. |
| 2011/0100058 | A1 | 5/2011 | Dickinson, Jr. et al. |
| 2011/0310487 | A1* | 12/2011 | Nagahama ............ E06B 9/24 359/599 |
| 2012/0195550 | A1 | 8/2012 | Ie et al. |
| 2012/0247063 | A1 | 10/2012 | Grzybowski et al. |
| 2012/0251773 | A1* | 10/2012 | Krasnov ............. C03C 15/00 428/141 |

FOREIGN PATENT DOCUMENTS

| | | |
|---|---|---|
| EP | 0201920 A1 | 11/1986 |
| EP | 1077302 A2 | 2/2001 |
| WO | 9945225 A1 | 9/1999 |
| WO | 2007141583 A1 | 12/2007 |
| WO | 2009011675 A1 | 1/2009 |

OTHER PUBLICATIONS

Friedl, "FAQ/INFO VIG + PROVIG"; http://www.vig-info.delProjektProVIG/FAQ-VIG.HTM, Oct. 2008.

Nippon Sheet Glass Spacia; http://www.nsg-spacia.co.jp/techlindex.html.

* cited by examiner

SHEET GLASS PRODUCT FABRICATION WITH GROWTH-LIMITED GLASS BUMP SPACERS

CROSS-REFERENCE TO RELATED APPLICATIONS

This application is a divisional of U.S. patent application Ser. No. US13/482114 filed on May 29, 2012, the content of which is relied upon and incorporated herein by reference in its entirety, and the benefit of priority under 35 U.S.C. § 120 is hereby claimed.

FIELD

The present disclosure relates generally to vacuum-insulated glass windows, and in particular to such windows that employ glass-bump spacers.

BACKGROUND

Vacuum-insulated glass (VIG) windows typically consist of two or more glass panes with an evacuated space therebetween. The evacuated space enhances thermal and noise insulating properties of the window, as compared to ordinary glass windows. Spacers are typically placed between the glass panes of such windows to maintain the aforementioned spacing. The spacers are typically discrete elements disposed and fixed between the glass panes and can be made of aluminum, plastic, ceramic, or glass.

Commonly-assigned US Patent Application Pub. No. 2010/0107525 provides a method of forming a VIG window where a plurality of glass bump spacers are integrally formed in a surface of one of the glass panes. The spacers are formed in the glass pane in a laser growth process.

BRIEF SUMMARY

The present inventors have recognized that the aforementioned spacer growth methodology can be enhanced by providing a scattering surface or scattering surface portion on a growth-limiting glass plate and by imparting properties of the scattering surface to a corresponding surface of the glass bump spacer. Concepts related to the structural features of the various VIG products contemplated herein and the manner in which a laser growth process can be executed to form glass bump spacers can be readily gleaned from the teachings in the aforementioned US Patent Application (Pub. No. 2010/0107525) the contents of where are incorporated herein by reference in their entirety. Nevertheless, it is contemplated that although the concepts of the present disclosure are described herein with primary reference to VIG glass products, such as, e.g., VIG glass windows, the concepts disclosed herein will enjoy broad applicability to any application where an evacuated or non-evacuated spacing is to be maintained between two opposing glass panes. It is also contemplated that the concepts disclosed herein will enjoy applicability to any laser-induced spacer growth process without limitation to the particular processes and laser growth system disclosed in the aforementioned patent application.

According to one embodiment of the present disclosure, a method of forming a sheet glass product comprises a plurality of growth-limited glass bump spacers. According to the method, a glass pane of the sheet glass product is irradiated with laser radiation to locally heat the glass pane at a plurality of spacer localities and induce growth of a plurality of glass bump spacers in the glass pane. The growth of the plurality of glass bump spacers is limited by utilizing a growth-limiting plate comprising a scattering surface portion. The scattering surface portion of the growth-limiting plate mitigates damage to the growth-limiting plate and may also mitigate damage to the glass pane.

According to another embodiment of the present disclosure, a system is provided for forming a growth-limited sheet glass product comprising a plurality of growth-limited glass bump spacers. The system comprises an optical system configured to irradiate a glass pane of the sheet glass product with laser radiation to locally heat the glass pane at a plurality of spacer localities and induce growth of a plurality of glass bump spacers in the glass pane. A growth-limiting plate is also provided and comprises the aforementioned scattering surface portion.

According to yet another embodiment of the present disclosure a vacuum insulated glass product is provided where the respective contact surfaces of the glass bump spacers comprise a scattering surface portion that is configured for significant scattering of ultraviolet or infrared laser light.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
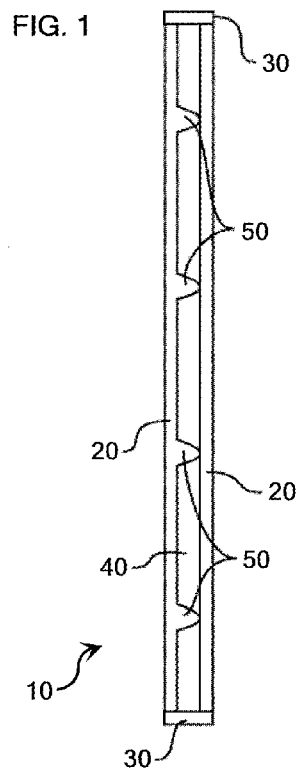
FIG. 1 illustrates a vacuum insulated glass product comprising opposing glass panes disposed opposite and substantially parallel to one another.

Although the concepts disclosed herein will enjoy applicability to any application where an evacuated or non-evacuated spacing is to be maintained between two opposing glass panes, for the purposes of illustration, reference is initially made to the VIG product 10 illustrated in FIG. 1, which comprises opposing glass panes 20 disposed opposite and substantially parallel to one another. An edge seal 30 is provided about the periphery of the glass panes 20 to define a hermetically sealed interior region 40 between the two glass panes 20. The sealed interior region 40 can be at least partially evacuated to provide desirable thermal and acoustic insulation properties.

Figure 2:
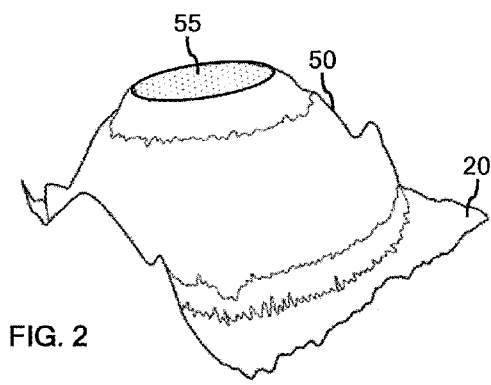
FIG. 2 illustrates one example of a contemplated glass bump spacer configuration according to the present disclosure.

The illustrated VIG product 10 further includes a plurality of glass-bump spacers 50 that are integrally formed in one or both of the glass panes 20. Although the size, scale, geometry, and general shape of contemplated glass bump spacers 50 can vary without departing from the scope of the present disclosure, FIG. 2 is presented to illustrate one example of a contemplated glass bump spacer configuration according to the present disclosure. Contemplated glass bump spacers 50 are integrally formed in the glass pane 20 and are not added as separate or discrete elements of the VIG product. Thus, the glass bump spacers 50 are formed from, and thus consist of, essentially the same material as the glass pane 20 and may be accurately described as extensions of the body portion of the glass pane 20.

As is noted above, the disclosure of US Patent Application Pub. No. 2010/0107525 presents a variety of suitable methods of forming glass bump spacers 50 in a glass pane. Generally, referring to FIG. 3, contemplated methods of forming glass bump spacers 50 will employ one or more mid-infrared-wavelength lasers, one or more high repetition-rate, nanosecond-pulse-width UV lasers, or combinations thereof, including other types of laser sources, and suitable optics 60 to focus a laser radiation 70 in the form of a laser beam at a focal point that is axially displaced slightly, e.g., approximately 0.8 mm to approximately 1.0 mm, beyond the glass pane in which the spacer 50 is to be formed. This focused laser radiation 70 makes it possible to locally heat the glass pane 20 to its working temperature and enable the formation of the glass-bump spacer 50.

Figure 3:
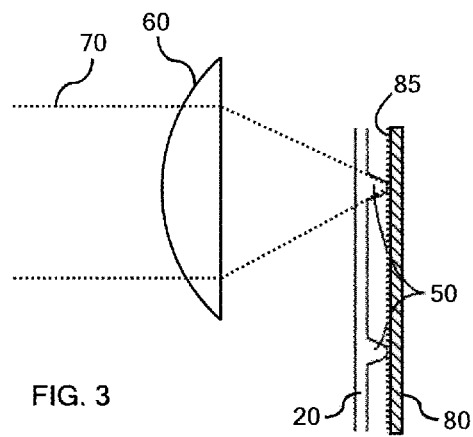
FIGS. 3 and 5 illustrate contemplated methods of forming a glass bump spacer.

More specifically, a portion of the laser radiation 70 is absorbed as it passes through the glass pane 20. This absorption serves to locally heat the glass pane, forming a limited expansion zone within the glass pane 20. It is worth noting that glass within the aforementioned expansion zone will, in many cases, melt and flow, as opposed to simply expanding. Since the expansion zone is constrained by unheated, and therefore unexpanded, regions of glass surrounding the expansion zone, the glass within the expansion zone is compelled to relieve internal stresses by melting, flowing, expanding, or otherwise growing upward, thereby forming a glass bump spacer 50. The spacer 50 can be fixed by rapidly cooling the heated region of the glass pane 20. In one contemplated embodiment, this fixing is accomplished by merely terminating the laser irradiation. Referring further to FIG. 3, a growth-limiting surface in the form of a glass plate 80 can be placed adjacent the glass pane 20 during glass bump spacer growth to limit growth of the glass bump spacer 50 to a certain bump height. The resulting glass-bump spacer 50 will have a substantially flat top portion, which is illustrated in detail in FIG. 2.

Figure 4:
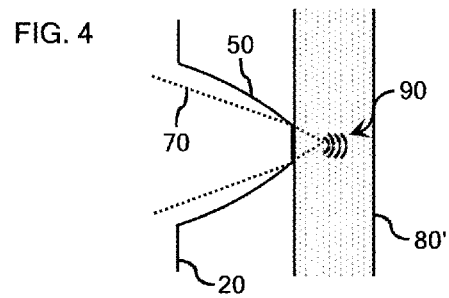
FIG. 4 illustrates the inventors' recognition that contemplated laser-induced growth processes can induce localized damage in a conventional growth-limiting glass plate.

Referring to FIG. 4, the present inventors have recognized that contemplated laser-induced growth processes can induce localized damage 90 in a conventional growth-limiting glass plate 80', which is typically highly transparent to the laser irradiation. Further, this localized damage 90 can induce localized cracking in the glass pane 20 in which a glass bump spacer 50 is grown. More specifically, bump growth experiments were carried out on 2-3 mm thick soda-lime glass using a 12-14 W laser beam and 0.3 s exposure. Localized damage 90 in the growth-limiting fused silica plate and fracturing of the soda-lime glass pane were observed. It is believed that the damage in the growth-limiting plate was caused by progressively tighter focusing in the glass bump spacer as growth progressed. In effect, the growing bump acted as a lens with a relatively small focal distance, leading to laser beam focusing inside the growth-limiting plate. Further, it is contemplated that damage may also have been induced in the glass pane as a portion of the irradiating laser beam was reflected from the incident surface of the growth-limiting plate and focused inside the soda-lime glass pane. Finally, it is contemplated that the localized damage induced in the growth-limiting plate initiated cracking in the soda-lime glass pane in which the bump was being grown.

Figure 5:
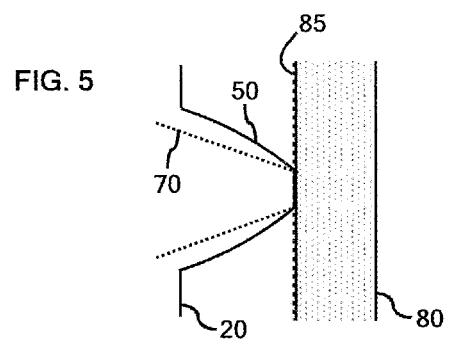

As is illustrated in FIGS. 3 and 5, the various sources of aforementioned damage to the growth-limiting plate 80 and the glass pane 20 can be mitigated by utilizing a scattering surface or scattering surface portion 85 on the growth-limiting side of the growth limiting glass plate 80 to inhibit laser beam focusing inside the growth-limiting plate 80 and to prevent the refocusing of reflected light back into the glass pane 20.

More specifically, according to the embodiment of the present disclosure illustrated in FIGS. 3 and 5, the growth of the plurality of glass bump spacers 50 is limited by utilizing a growth-limiting plate 80 that comprises a scattering surface portion 85 positioned in the optical path of the laser radiation 70. As is illustrated schematically in FIG. 3, the optical path extends from a source of the laser radiation, through the glass pane 20, to the scattering surface portion 85 of the growth-limiting plate 80. The scattering surface portion 85 of the growth-limiting plate 80 is designed to scatter the laser radiation that is used to locally heat the glass pane and may be presented in a variety of forms. For the purposes of defining and describing the concepts of the present disclosure, it is noted that "significant" scattering is understood to mean a degree of scattering that would mitigate at least a majority of the aforementioned damage to the glass pane 20 or growth-limiting plate 80.

Referring collectively to FIGS. 1 and 2, the glass bump spacers 50 extend across the interior region defined between the opposing glass panes 20 to define respective contact surfaces against which a face of one of the opposing glass panes 20 rests. It is contemplated that the glass bump spacers 50 can be integrally formed in one or both of the opposing glass panes 20. In either case, the opposing glass pane will rest against a contact surfaces of a glass bump spacer 50, if the respective spacer heights and glass pane planarity are controlled properly. The respective contact surfaces of the glass bump spacers 50 will comprise a complementary scattering surface portion 55 because the glass bump spacers come into contact with the scattering surface portion 85 of the growth-limiting plate 80 during the growth process. As such, the optical and mechanical properties of the complementary scattering surface portion 55 will mimic that of the scattering surface portion 85 of the growth-limiting plate 80. In particular, it is contemplated that the scattering surface portion 55 may also help reduce mechanical stress at the plane of contact defined between the scattering surface portion 55 of the spacer 50 and a corresponding surface of an opposing glass pane 20.

For example, and not by way of limitation, the growth-limiting plate 80 may comprise a borosilicate or fused silica glass plate and the scattering surface portion may be presented as a ground surface portion of the plate. Alternatively, the scattering surface portion may be presented by providing an optically engineered scattering surface on the growth-limiting plate 80, which surface may be applied to or integrally formed in a surface of the growth-limiting plate 80. Examples of optically engineered scattering surfaces include, but are not limited to, mechanically ground, etched, or leeched surfaces. In instances where the present disclosure refers to a particular structure as a "plate," it is noted that the "plate" need not be a uniform, sheet-like structure. Rather, for the purposes of defining and describing concepts of the present disclosure, it is noted that a "plate" may comprise any structure that presents a continuous or discontinuous, regular or irregular, flat or curved face.

In some contemplated embodiments of the present disclosure, the glass pane is irradiated with UV laser radiation to induce growth of the plurality of glass bump spacers 50 in the glass pane 20 and the scattering surface portion 85 of the growth-limiting surface is configured for significant scattering of UV laser radiation. Contemplated UV wavelengths for effective growth and scattering lie between about 340 nm and about 380 nm. In other contemplated embodiments of the present disclosure, the glass pane is irradiated with IR laser radiation to induce growth of the plurality of glass bump spacers 50 in the glass pane 20 and the scattering surface portion 85 of the growth-limiting surface is configured for significant scattering of IR laser radiation. Contemplated IR wavelengths for effective growth and scattering lie between about 800 nm and about 1600 nm.

For the purposes of describing and defining the present disclosure, it is noted that recitations herein of "at least one" component, element, etc., should not be used to create an inference that the alternative use of the articles "a" or "an" should be limited to a single component, element, etc. It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claims. Rather, these terms are merely intended to identify particular aspects of an embodiment of the present disclosure or to emphasize alternative or additional features that may or may not be utilized in a particular embodiment of the present disclosure.

For the purposes of describing and defining the present embodiments it is noted that the terms "substantially," "approximately," and "about" are utilized herein to represent the inherent degree of uncertainty that may be attributed to any quantitative comparison, value, measurement, or other representation. The terms "substantially," "approximately," and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. It is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A vacuum insulated glass product comprising opposing glass panes and an edge seal, wherein:
    the opposing glass panes are disposed in a spaced relation opposite and substantially parallel to each other to define an interior region there between;
    the edge seal is disposed about a periphery of the glass panes to hermetically seal the interior region defined between the opposing glass panes;
    at least one of the glass panes comprises a plurality of glass bump spacers integrally formed therein;
    the glass bump spacers extend across the interior region defined between the opposing glass panes and each comprise a glass contact surface against which a face of one of the opposing glass panes rests; and
    the glass contact surface of at least one of the glass bump spacers comprises a glass scattering surface portion that is integrally formed with the glass contact surface and the at least one of the glass bump spacer and configured for significant scattering of ultraviolet or infrared laser light.

2. The product as claimed in claim 1 wherein the glass scattering surface portion of the at least one glass bump spacer is configured for significant scattering of UV laser radiation.

3. The product as claimed in claim 1 wherein the glass scattering surface portion of the at least one glass bump spacer is configured for significant scattering of laser radiation between about 340 nm and about 380 nm.

4. The product as claimed in claim 1 wherein the glass scattering surface portion of the at least one glass bump spacer is for significant scattering of IR laser radiation.

5. The product as claimed in claim 1 wherein the glass scattering surface portion of the at least one glass bump spacer is configured for significant scattering of laser radiation between about 800 nm and about 1600 nm.

6. The product as claimed in claim 1 wherein the vacuum insulated glass product comprises more than one pair of opposing glass panes.

7. The product as claimed in claim 1 wherein:
    the glass bump spacers are integrally formed in only one of the opposing glass panes; and
    the other of the opposing glass panes rests against the glass contact surfaces of the glass bump spacers.

8. The product as claimed in claim 1 wherein:
    the glass bump spacers are integrally formed in both of the opposing glass panes; and
    both of the opposing glass panes rest against respective glass contact surfaces of the glass bump spacers.

9. The product as claimed in claim 1 wherein the glass scattering surface portion of the at least one glass bump spacer comprises roughened glass.

10. The product as claimed in claim 1 wherein the glass scattering surface portion is arranged only on the plurality of glass bump spacers.

* * * * *

UNITED STATES PATENT AND TRADEMARK OFFICE
CERTIFICATE OF CORRECTION

PATENT NO. : 10,358,386 B2
APPLICATION NO. : 15/096751
DATED : July 23, 2019
INVENTOR(S) : Richard Robert Grzybowski et al.

Page 1 of 1

It is certified that error appears in the above-identified patent and that said Letters Patent is hereby corrected as shown below:

In the Claims

In Column 6, Line 22, Claim 1, delete "hump" and insert -- bump --, therefor.

Signed and Sealed this
Twenty-fourth Day of December, 2019

Andrei Iancu
*Director of the United States Patent and Trademark Office*